United States Patent [19]
Vines et al.

[11] Patent Number: 6,006,171
[45] Date of Patent: Dec. 21, 1999

[54] DYNAMIC MAINTENANCE MANAGEMENT SYSTEM

[76] Inventors: Caroline J. Vines, 3 Fletcher St., Foxboro, Mass. 02035; Sharath Komarla, 2305 Village Rd. West, Norwood, Mass. 02062; Houghton S. Leroy, Jr., 22 Bishop Rd., Rochester, Mass. 02770; Richard A. McGuire, 11 Whitney La., Upton, Mass. 01562

[21] Appl. No.: 08/901,847

[22] Filed: Jul. 28, 1997

[51] Int. Cl.⁶ .............................. G05B 11/01; G06F 12/50
[52] U.S. Cl. ........................... 702/184; 395/670; 364/188
[58] Field of Search ....................... 702/184; 340/825.06, 340/825.19, 706; 376/216, 215; 364/188, 474.15, 474.22; 395/670

[56] References Cited

U.S. PATENT DOCUMENTS

| | | | |
|---|---|---|---|
| 4,679,137 | 7/1987 | Lane et al. | 364/188 |
| 5,081,599 | 1/1992 | Bellows et al. | 364/550 |
| 5,247,693 | 9/1993 | Bristol | 395/705 |
| 5,297,253 | 3/1994 | Meisel | 345/357 |
| 5,321,629 | 6/1994 | Shirata et al. | 364/551.01 |
| 5,392,208 | 2/1995 | Takita et al. | 364/188 |
| 5,442,746 | 8/1995 | Barrett | 345/357 |
| 5,444,837 | 8/1995 | Bomans et al. | 345/440 |
| 5,465,221 | 11/1995 | Merat et al. | 364/552 |
| 5,576,946 | 11/1996 | Bender et al. | 364/146 |
| 5,631,825 | 5/1997 | van Weele et al. | 364/188 |

FOREIGN PATENT DOCUMENTS

| | | |
|---|---|---|
| 06 F 9/44 | 3/1991 | Germany . |
| 05 B 19/417 | 11/1994 | Germany . |
| WO 91/06050 | 5/1991 | WIPO . |
| WO 91/19237 | 12/1991 | WIPO . |

OTHER PUBLICATIONS

Benson et al., "Multimedia Data Management for Process Control", Multimedia, 1994 International Conference, 1994.

"IA Series Intergrated Control Software", PSS 21S–3B1, 83, The Foxboro Company, 5/95.

"IA Series Human Interface Software", PSS 21S–2B1 B3, The Foxboro Company, 12/93.

"IA Series FOXEDM–Intergrated Electronic Document Management", PSS 21S–2C1 B3, The Foxboro Company, 4/96.

"Hyperframe: A Hypemedia Framework for Intergration of Engineering Applications" Tsuchida et al., ACM 0–89791–630–1/93/0010/0345, 1993.

"Towards an Intergrated Maintenance Advisor", Hayes and Pepper, ACM Hypertext '89 Proceedings, 6/89.

"Advanced Database Techniques for Control Room Operators", Van Sikel et al., Electrical Power Research Institute, #EPRI–GS–6635, 4/96.

*Primary Examiner*—Kamini Shah
*Attorney, Agent, or Firm*—Fish & Richardson P.C.

[57] ABSTRACT

A computerized maintenance management system for the process control environment which integrates a CMMS system with a process control system. The system includes configurator software which allows users to link process control data and maintenance management data using a graphical user interface. Integration provides the ability to identify conditions requiring work order response and to either automatically respond to such conditions or to notify plant operators and engineers of required actions. The integrated system can easily associate work orders, maintenance history and equipment health with operational assets using process control objects such as motors, valves, pumps, alarms, and other device display icons.

11 Claims, 10 Drawing Sheets

Microfiche Appendix Included
(6 Microfiche, 546 Pages)

| | FOXBORO: DISPLAY MANAGER SUNS1C=SUNS1C | |
|---|---|---|
| APPLICATION STARTUP ON_LOGICAL_HOST | | 6:56 7-28-97 |

SYS  ALARM  HELP  FOXDMM-DISP  DISP_1 DISP_2 DISP_3  SELECT

EQUIPMENT WORK ORDER HISTORY

EQUIPMENT 13100
DESCRIPTION FEEDER SYSTEM

| WORK ORDER | DATE | DESCRIPTION | PROB. CODE |
|---|---|---|---|
| 2004 | 1995-10-31 | FEEDER JAMMED | |
| 3007 | 1995-10-28 | FEEDER INSPECTION AND CERTIFICATION | |
| 5004 | 1995-10-31 | FEEDER JAMMED | |
| 6004 | 1995-10-31 | FEEDER JAMMED | |
| | | | |
| | | | |
| | | | |

| START QUERY | SELECT WORK ORDER | PREVIOUS RESULTS | PAGE 1 OF 1 | 1ST PAGE | PREV PAGE | NEXT PAGE | +10 PAGES | -10 PAGES |

FIG. 8

```
┌─────────────────────────────────────────────────────────────┐
│ □     FOXBORO: DISPLAY MANAGER SUNS1C=SUNS1C                │
├─────────────────────────────────────────────────────────────┤
│ APPLICATION   STARTUP  ON_LOGICAL_HOST        6:57 7-28-97  │
├─────────────────────────────────────────────────────────────┤
│ SYS  ALARM  HELP  FOXDMM-DISP  DISP_1 DISP_2 DISP_3  SELECT │
│                    WORK ORDER REQUESTS                      │
│                                                             │
│                                                             │
│        WORK ORDER (AUTOKEYED)  WO PRIORITY [9]              │
│        DESCRIPTION [INSPECT AND REPAIR PUMP AS NEEDED]      │
│          EQUIPMENT [11470]                                  │
│         REPORTED BY [R. SMITH]    PHONE [X 3546]            │
│                                                             │
│                                                             │
│                                                             │
│     ┌──────────────┐   ┌──────────────┐   ┌──────────────┐  │
│     │  SUBMIT WO   │   │              │   │              │  │
│     │ FOR APPROVAL │   │   OVERVIEW   │   │    CANCEL    │  │
│     └──────────────┘   └──────────────┘   └──────────────┘  │
│                                                             │
│                                                             │
└─────────────────────────────────────────────────────────────┘
```

FIG. 9

| | FOXBORO: DISPLAY MANAGER SUNS1C=SUNS1C | |
|---|---|---|
| APPLICATION STARTUP ON_LOGICAL_HOST | | 6:59 7-28-97 |
| SYS ALARM HELP FOXDMM-DISP DISP_1 DISP_2 DISP_3 SELECT | | |

WORK ORDER STATUS

WORK ORDER: 3010   WO: PRIORITY [ ]  LOC/EQ PRIORITY: 4
DESCRIPTION: FORKLIFT QUARTERLY INSPECTION AND CERTIFICATION
LOCATION: SHIPPING
EQUIPMENT: 12400   FORKLIFT #2
REPORTED BY: MAXIMO   DATE: 1995-10-28   PHONE:
STATUS: WSCH   DATE: 1995-10-28
WORK TYPE:   WARRANTY DATE: 1995-03-30   EQUIP UP? Y

| PROBLEM | RESPONSIBILITY | MODIFIED |
|---|---|---|
| FAILURE CLASS: | SUPERVISOR: MILLER | BY: MAXIMO |
| PROBLEM CODE: | LEAD CRAFT: ME1 | DATE: 1995-10-05 |

SCHEDULING INFORMATION
            START    COMPLETION
SCHEDULED
DOWNTIME REQ'D? Y   INTERRUPTABLE? N   CREW:
EST. DURATION: 1   REMAING DURATION:

PREVIOUS RESULTS    FOXOMM MAIN MENU
START QUERY    OVERVIEW

FIG. 10

DYNAMIC MAINTENANCE MANAGEMENT SYSTEM

REFERENCE TO MICROFICHE APPENDIX

A microfiche appendix is attached to this application. The appendix, which includes a source code listing of an embodiment relating to the invention, includes 546 pages of source code on 6 microfiche.

A portion of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Computerized maintenance management systems (CMMS) are tools for planning and scheduling equipment maintenance and asset management to meet the needs of modern plants and facilities. Using information about system components, CMMS software schedules maintenance, repairs, and inspections of such components. CMMS software notifies operations personnel when maintenance or other action is necessary. One example of CMMS software is the MAXIMO system, offered by Project Software & Development, Inc. (PSDI), of Cambridge, Mass.

Process control software is used in plants and other facilities to monitor, record, and control process conditions. Process control software models system processes using process variables. A process variable may be used to model a characteristic of a system component. A process variable has a range of values corresponding to a possible range of conditions of the aspect of the process being modeled by the process variable. Process control software may obtain process variable data through a number of means including manual input, sensor input, and interpolation and extrapolation from previous data. A process variable may, for example, obtain temperatures from a temperature sensor.

The values of process variables can be set and monitored, and alarms can be signaled upon detection of error conditions. Process variable histories are recorded and can be archived, printed in reports or displayed in graphs, or fed back into the process control software. One example of process control software is the I/A Series system from the Foxboro Company of Foxboro, Massachusetts. Foxboro Company is a subsidiary of Siebe PLC.

SUMMARY OF THE INVENTION

The invention relates to the integration or dynamic linkage of CMMS software and process control software. In one aspect, the invention features computer software for enabling sharing of data between process control software running on one computer and maintenance management software running on another computer. The communication may consist of using a graphical user interface to enable a user to associate process variables used by the process control software with equipment identifiers used by the maintenance management software. The user associates a process variable with an equipment identifier by selecting a process variable from a list and dragging the process variable to the desired equipment identifier. The user can specify, also using a graphical user interface, a monitoring type or alarm type and related parameters to associate with the link.

The invention facilitates the consistent, timely collection of equipment-related data that is of central importance in maintenance management. This data is collected through a combination of real-time electronic interfaces and intuitive data entry screens. Through user-established automatic data feeds from the process control software to a condition monitoring module, the invention integrates operations and maintenance. Using the invention, data need only be entered once, thus eliminating redundant data entry and decreasing the time needed for data entry and the possibility of entry errors.

The use of collected maintenance data to derive accurate and detailed downtime records and equipment failure analysis enables the frequencies and root causes of component failures and equipment downtime to be identified. Using such information, maintenance personnel can respond accordingly and control room operators can make better-informed decisions and engage in more proactive planning. This results in increased performance and predictability of equipment and operations, and reduced maintenance costs.

The invention provides fast access to maintenance information on any operational asset monitored by the system. Operations can be easily linked manually or automatically with the maintenance software to quickly respond to process conditions requiring work order response. All personnel have instant access to the same centrally located information for consistently faster responses to maintenance needs. This translates into improved equipment reliability, increased productivity and reduced operational costs while satisfying asset management requirements.

DETAILED DESCRIPTION OF THE PREFERRED EMBODIMENTS

In the preferred embodiment, process control software such as Foxboro's I/A Series system is integrated with CMMS software such as PSDI's MAXIMO using common Application Programmer Interfaces (APIs). The result of this integration will be referred to as the dynamic maintenance management (DMM) system. To integrate the existing process control and CMMS client software existing on a PC, the user installs configurator software on the PC which allows the user to link information between the process control software and the CMMS software. The configurator software is installed using a standard installation program. As an example of an implementation of the configurator, source listings in C++ are contained in the Microfiche Appendix. The source code makes use of the definitions contained in Appendix A hereto.

Integration of the process control software with the CMMS software may also require expanding the lengths of certain fields in the CMMS database. When using PSDI's MAXIMO system, for example, the length of the EQNUM column in the Equipment Table is expanded from 8 to 14, the length of the EQ14 column in the Equipment Table is expanded from 1 to 40, and the length of the POINTNUM column in the Measurepoint Table is expanded from 8 to 14.

Figure 1:
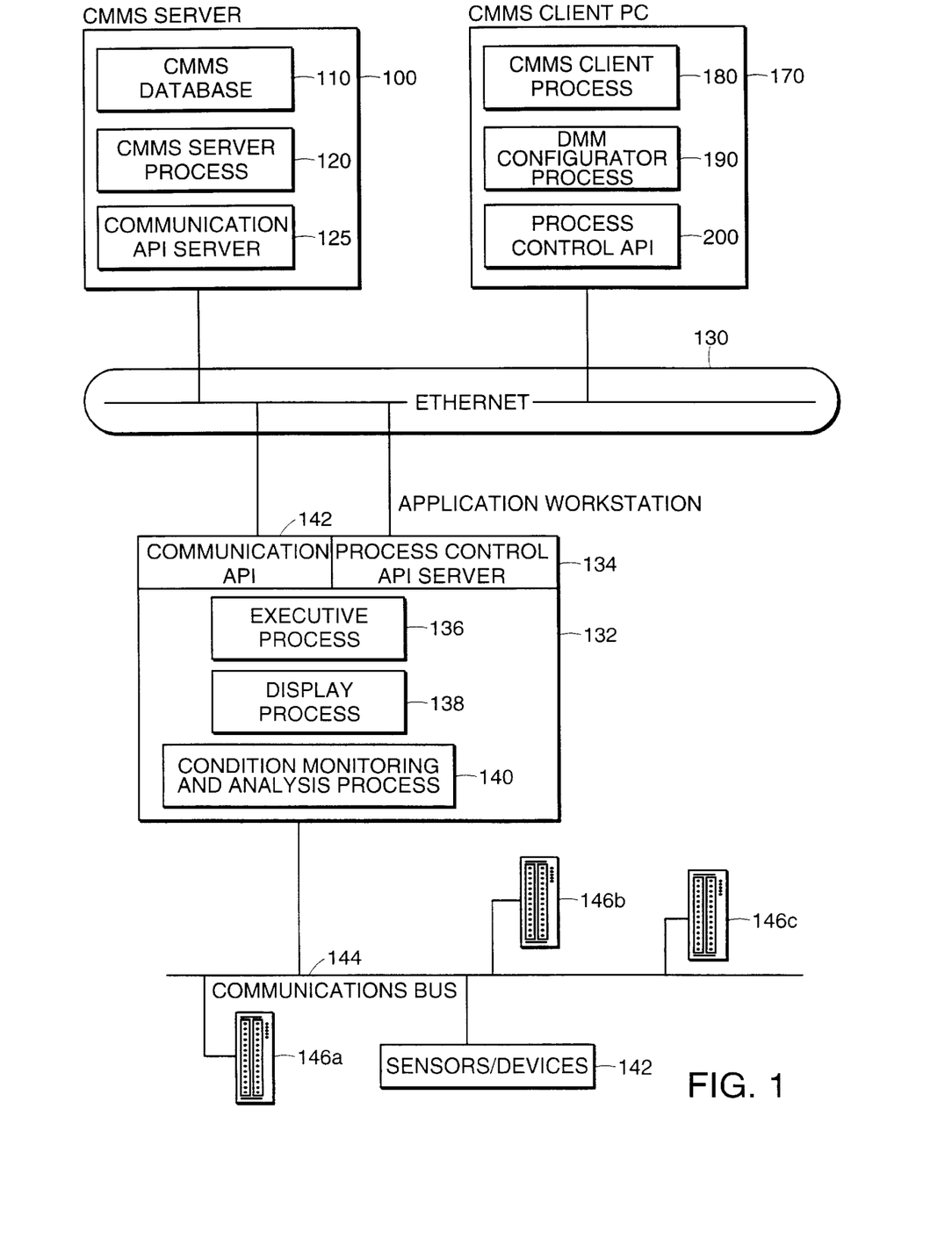
FIG. 1 is a block diagram of the relationships among components of the preferred embodiment.

Referring to FIG. 1, a CMMS server 100 contains a CMMS database 110 and runs a CMMS server process 120 which interfaces with other processes through a communication API server 125 over a network 130, such as an Ethernet network. A CMMS client personal computer (PC) 170 runs a CMMS client process 180 and a DMM configurator process 190 which interfaces with other processes over a network 130 through a process control API 200. In the preferred embodiment, the DMM configurator process 190 is FoxBoro's Dynamic Maintenance Management (DMM) configurator process, and the process control API 200 is Foxboro's Net FoxAPI.

An application workstation 132 runs a process control API server 134 which communicates over a network 130 using TCP/IP. In the preferred embodiment, the application workstation 132 is a Foxboro AW51 station and the process control API server 134 is a Foxboro Net FoxAPI server. An executive process 136 performs housekeeping tasks such as polling for changes to a configuration by the DMM configurator process 190. A display process 138 provides a graphical user interface for control room operators to, e.g., access the CMMS Database 110 for information such as equipment history, or issue work order requests. A condition monitoring and analysis process 140 sends and receives process control data to and from sensors and devices 142 over a communications bus 144. In the preferred embodiment, the communications bus 144 is Foxboro's NODEBUS. Other computers and devices used in the process control system 146a–c are also communicated with over the communications bus 144.

Figure 2:
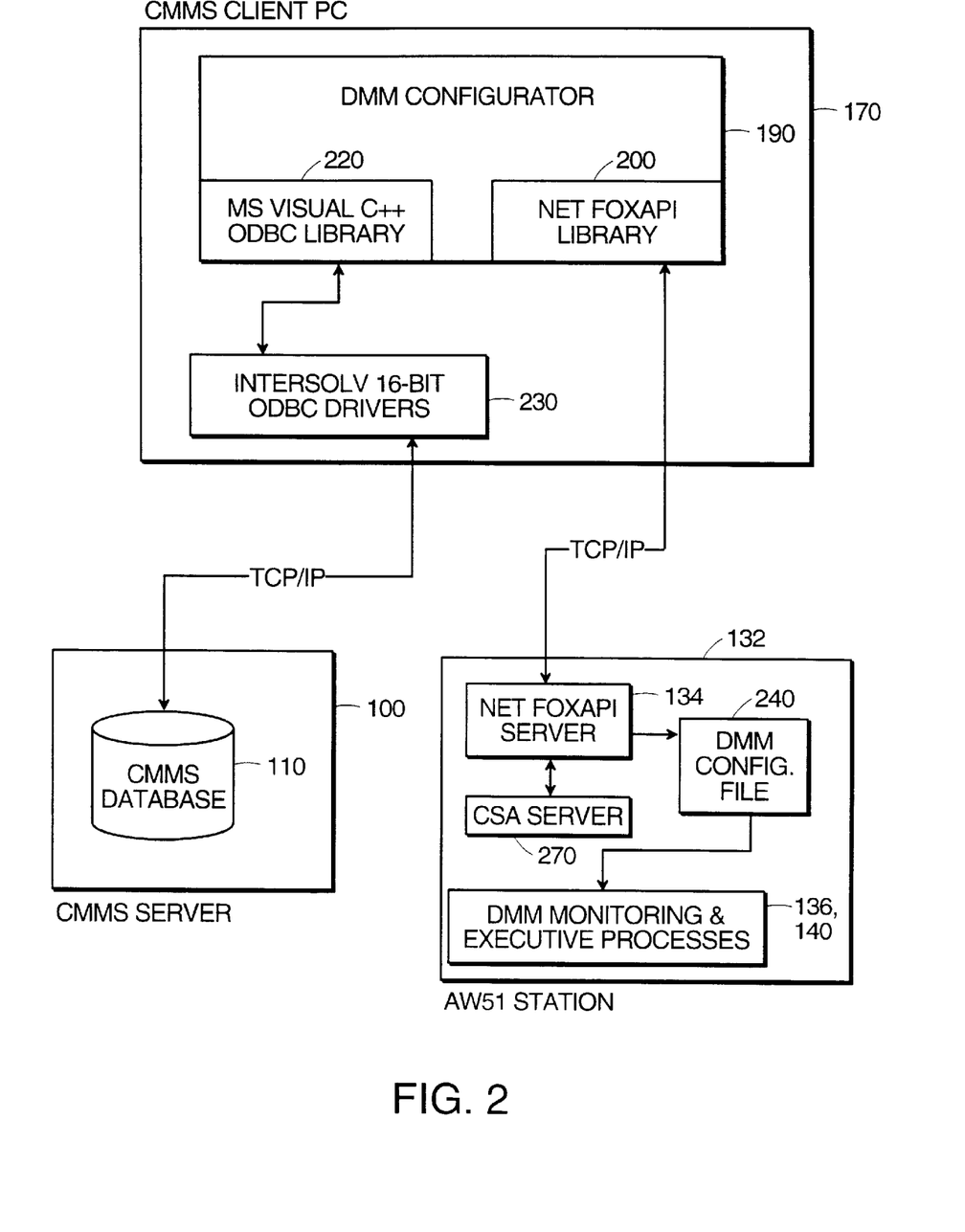
FIG. 2 is a block diagram of the flow of data among the components of the preferred embodiment.

Referring to FIG. 2, in the preferred embodiment the DMM configurator process 190 resides on a personal computer (PC) client 170. In the preferred embodiment, the DMM configurator process 190 is implemented using Microsoft Visual C++. The DMM configurator process 190 interfaces with the CMMS database 110 residing on the CMMS server 100 to obtain equipment and measurement point names and identifiers already established in the CMMS system through calls to the Microsoft Visual C++ ODBC library 220. The ODBC library interfaces with Intersolv 16-bit ODBC drivers 230 which reside on the PC Client 170. The ODBC drivers 230 use TCP/IP to communicate with the CMMS database 110.

The DMM configurator process 190 obtains process variable information from the process control system by calls to the Net FoxAPI library 200. The Net FoxAPI library 200 uses TCP/IP to communicate with the Net FoxAPI server 134 which resides on the process control application workstation 132, in this case an AW51 station. The Net FoxAPI server 134 accesses an I/A Series CSA Server 270 to obtain process variable information which is then sent back to the DMM configurator process 190.

The DMM configurator process 190 conveys configuration information to the DMM monitoring and executive software on the process control application workstation 132 by writing the new or updated configuration file 240 to a specific directory on the process control application workstation 132 using the Net FoxAPI 134. The DMM executive process 136 polls periodically for an updated configuration file 240, then notifies the monitoring processes 140. The monitoring processes 140 then read the new configuration file 240.

Integration of the CMMS software and the process control software is achieved by using the DMM configurator process 190, which allows the user to create configurations which link process variables in the process control software to equipment data stored in the CMMS database. The DMM configurator process 190 is used to establish parameters including: selection of process control monitoring station, association of equipment tag names in the maintenance database with process control variables, monitoring type per device, monitoring scan frequencies, warning and action filter limits, selection of system alarm and process alarm devices, and conditions for generating work order requests.

In the preferred embodiment, the configurator is implemented as a computer program in Visual C++. It obtains equipment information from the CMMS database 110 using Structured Query Language (SQL) calls through Intersolv ODBC drivers 230, and the configurator obtains process variables from the I/A Series system using Foxboro's Net FoxAPI.

Figure 3:
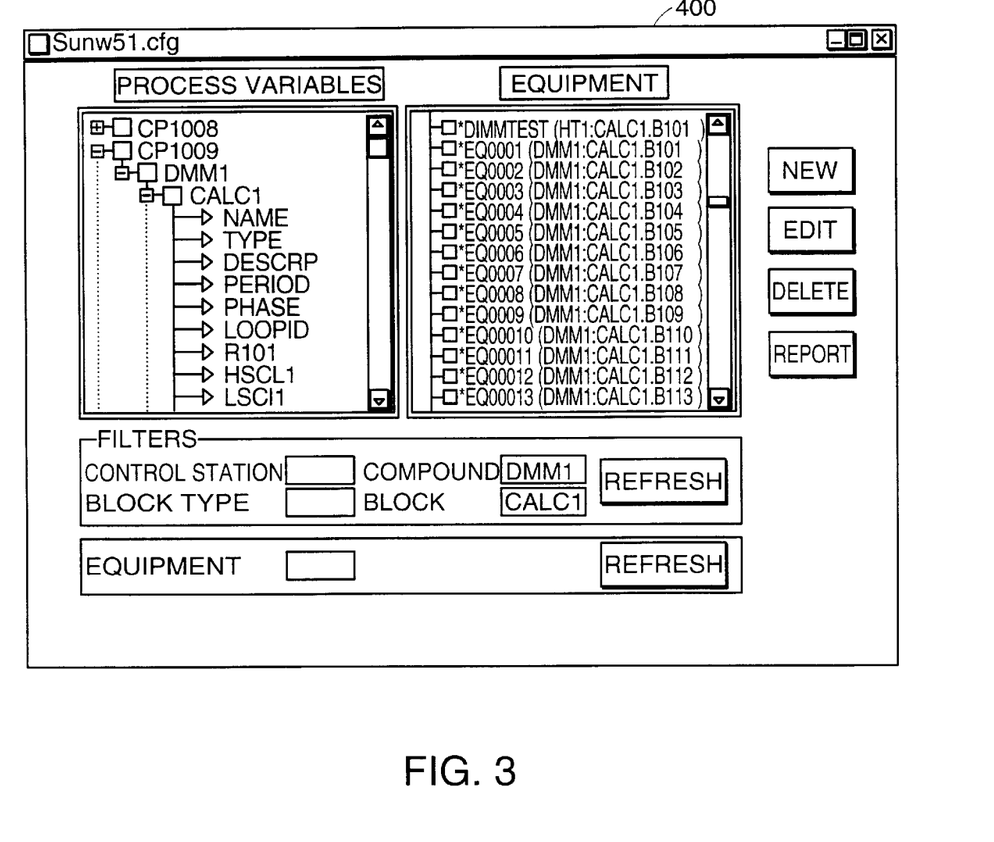
FIG. 3 is a screenshot of the DMM configurator main dialog box.

The DMM configurator process 190 displays a main dialog box 400 (FIG. 3) to the user. The dialog box contains two sub-windows 450a, 450b. The sub-window on the left 450a displays process variables used in the process control software. The sub-window on the right 450b displays measurement points or identification numbers or other identifiers (IDs) of equipment stored in the CMMS database. Indentation is used in both 450a and 450b to show sub-fields of process variables and equipment IDs, respectively. To create a link between a process variable listed in 450a and a piece of equipment listed in 450b, the user performs the following steps:

(1) Click on a process variable displayed in 450a.

(2) Drag and drop the process variable onto an equipment ID or measurement point displayed in 450b.

Figure 4:
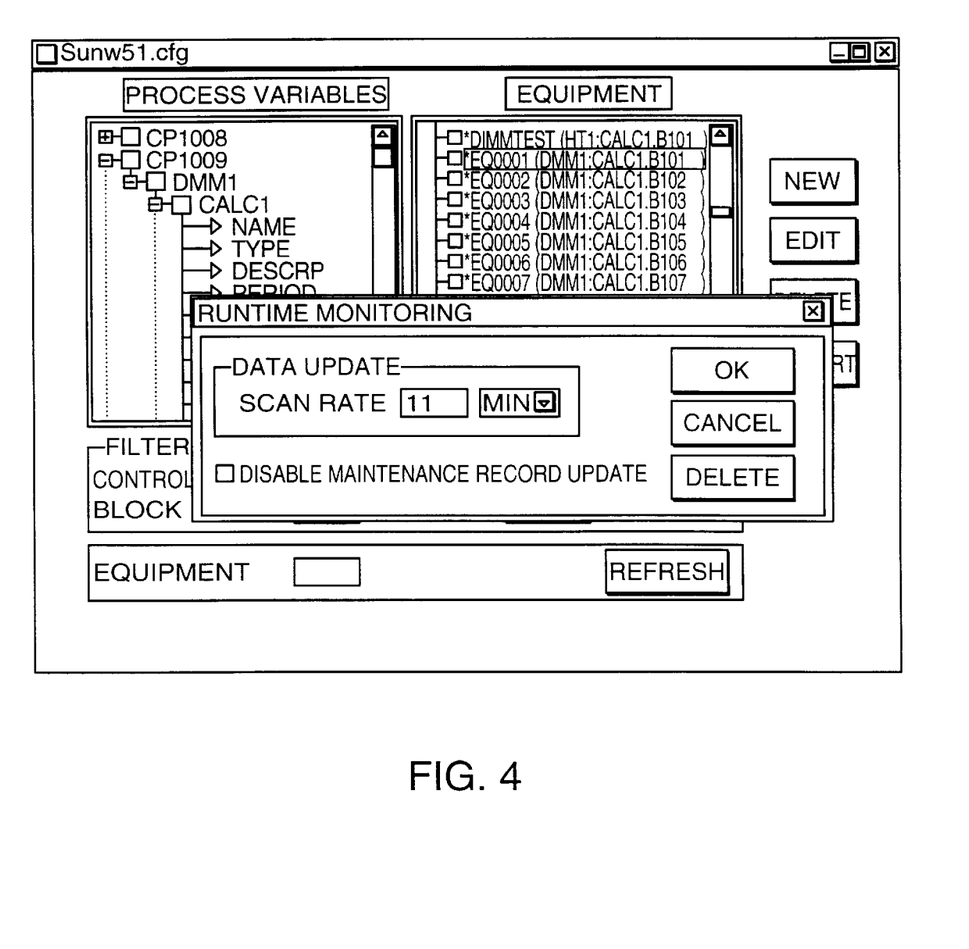
FIG. 4 is a screenshot of the DMM configurator runtime monitoring dialog box.
Figure 5:
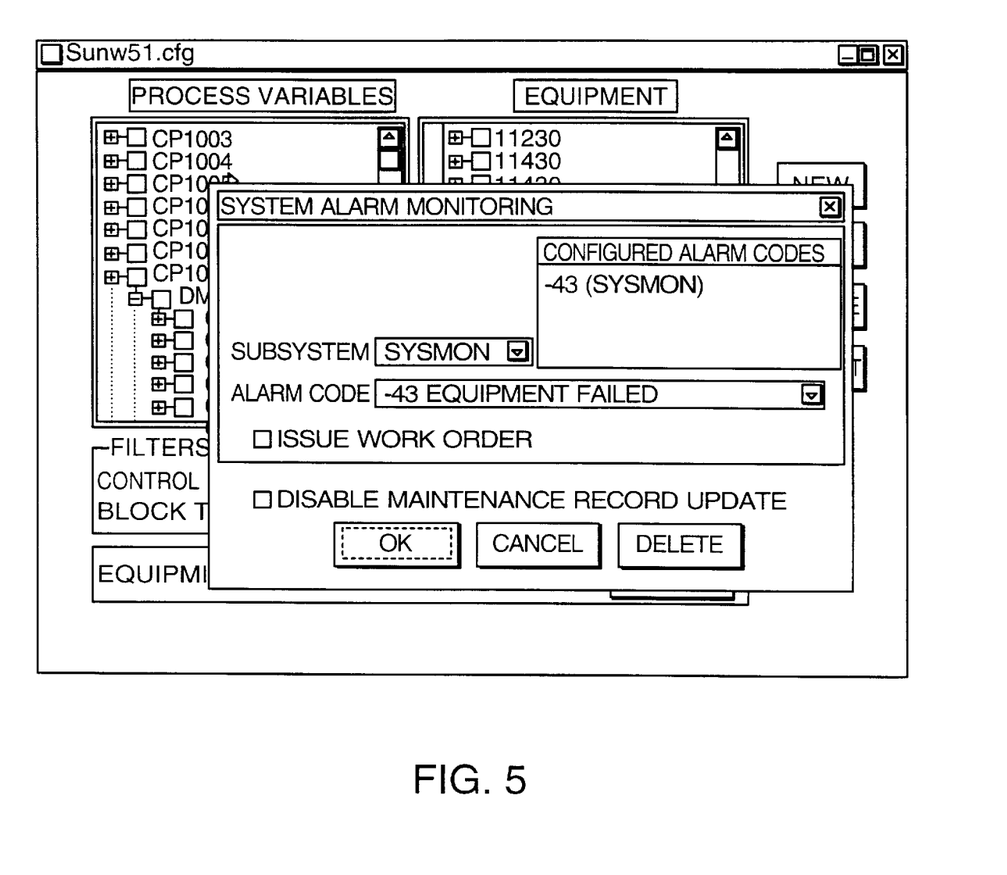
FIG. 5 is a screenshot of the DMM configurator system alarm monitoring dialog box.

(3) Click the New button 460 and select the monitoring or alarm type from among the following choices: runtime (for tracking equipment runtimes for preventive maintenance), point (for tracking process variable values for condition monitoring), system alarm (for tracking equipment alarm conditions for condition monitoring), and process alarm (for tracking process variable alarm conditions for condition monitoring). An appropriate dialog box will then be displayed for the monitoring or alarm type chosen. The dialog box for runtime monitoring is shown in FIG. 4. The dialog box for system alarm monitoring is shown in FIG. 5.

(4) From the dialog box that appears after performing step (3), choose the parameter values desired from the list in Table 1.

TABLE 1

| Monitoring or alarm type | Parameter |
| --- | --- |
| Runtime | Scan rate frequency |
| Point | Scan rate, high and low warning levels, and high and low action levels |
| Process Alarm | Alarm type |
| System Alarm | Alarm subsystem and associated alarm codes. |

The existence of a link between a process variable and a piece of equipment is indicated in the equipment column 450b, as shown in FIG. 3, by the presence of a linked process variable name displayed in parentheses after an equipment ID or measurement point.

Along the bottom of the dialog box 400 are two frames containing field parameters. The top frame 410, contains four fields: control station 430*a,* block type 430*b,* compound 430*c,* and block 430*d.* The bottom frame 420, containing the equipment field 440, filters equipment IDs. The user can filter the data displayed in columns 450*a,* 450*b* by entering values in one or more of 430*a,* 430*b,* 430*c,* 430*d,* or 440. For example, to see only the compound process variables beginning with "CP", the user types "CP*" in the compound field 430*c.* Filtering data can reduce screen clutter and allow the user to focus on data with specified characteristics.

Creating a link as described above integrates the process control software data into the CMMS. Once this has been done, data can be shared between the CMMS software and the process control software. For example, data from the CMMS database can be made accessible to the control room operator through the user interface of the process control software.

Figure 6:
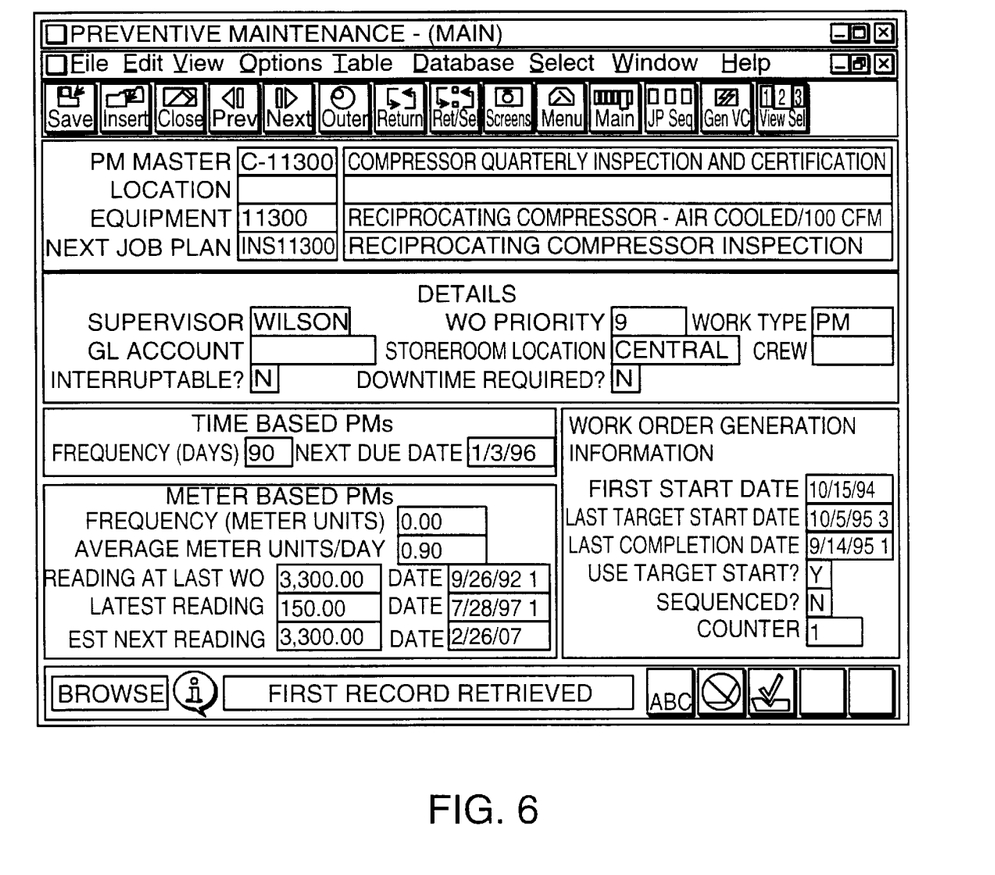
FIG. 6 is a screenshot of the preventive maintenance screen.

The DMM system has several modules. Real-time data for start/stop devices is integrated into the equipment module. The equipment module includes a data monitor which collects equipment runtime data from the process control software process and performs appropriate calculations on the data. This information, including time-stamped equipment usage data, total number of starts, and status information, is then moved into the CMMS database. Maintenance related information can then be reviewed in the preventive maintenance module shown in FIG. 6. The preventive maintenance module can be configured to automatically initiate a work order request when cumulative runtime for a device is reached.

Figure 7:
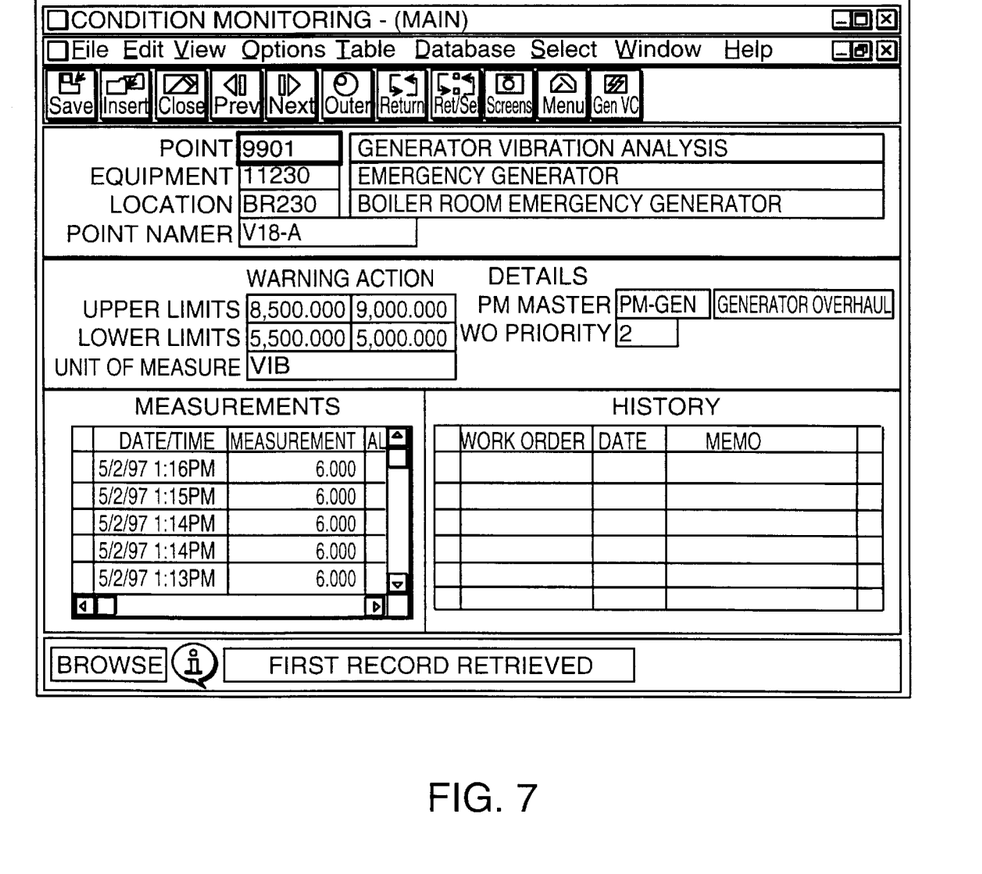
FIG. 7 is a screenshot of the condition monitoring screen.

Furthermore, sensor data collected from the process control software process is used by a condition monitoring application of the equipment module shown in FIG. 7 to predict failures and ensure timely maintenance as a means of avoiding catastrophic or unnecessary failure. Process control software process variables selected for monitoring are scanned at a specified rate, and their time-stamped values and status information are sent to the CMMS database for storage and condition monitoring analysis. As the values of these process variables cross user-defined action limits, appropriate work order requests are automatically initiated.

The DMM alarm handler receives and decodes process alarms and system alarms for DMM-configured process variables and equipment devices. The alarm information is stored in the maintenance database for review through the condition monitoring application interface. DMM condition monitoring can be configured to automatically initiate work order requests for both types of alarms when conditions are met.

Figure 8:
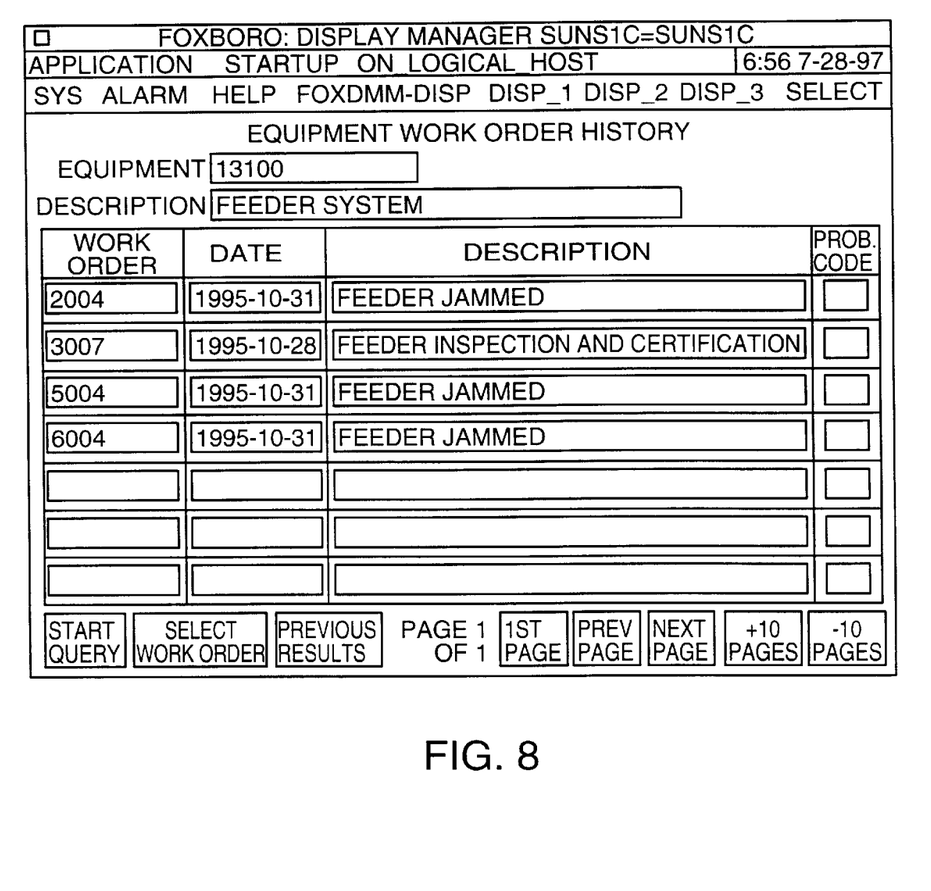
FIG. 8 is a screenshot of the equipment history Screen.

Process control operators access certain DMM work order related activities on application workstations through pull-down menu choices or graphical user interface buttons. The operator can track the history of work that has been performed on a specific piece of equipment by viewing the equipment history screen shown in FIG. 8. This screen displays a list of work order IDs, dates, problem descriptions, and problem codes associated with a piece of equipment. This screen also provides on-line problem tracking capabilities which allow the operator to select a work order from this list in order to view the work order status in more detail.

Figure 9:
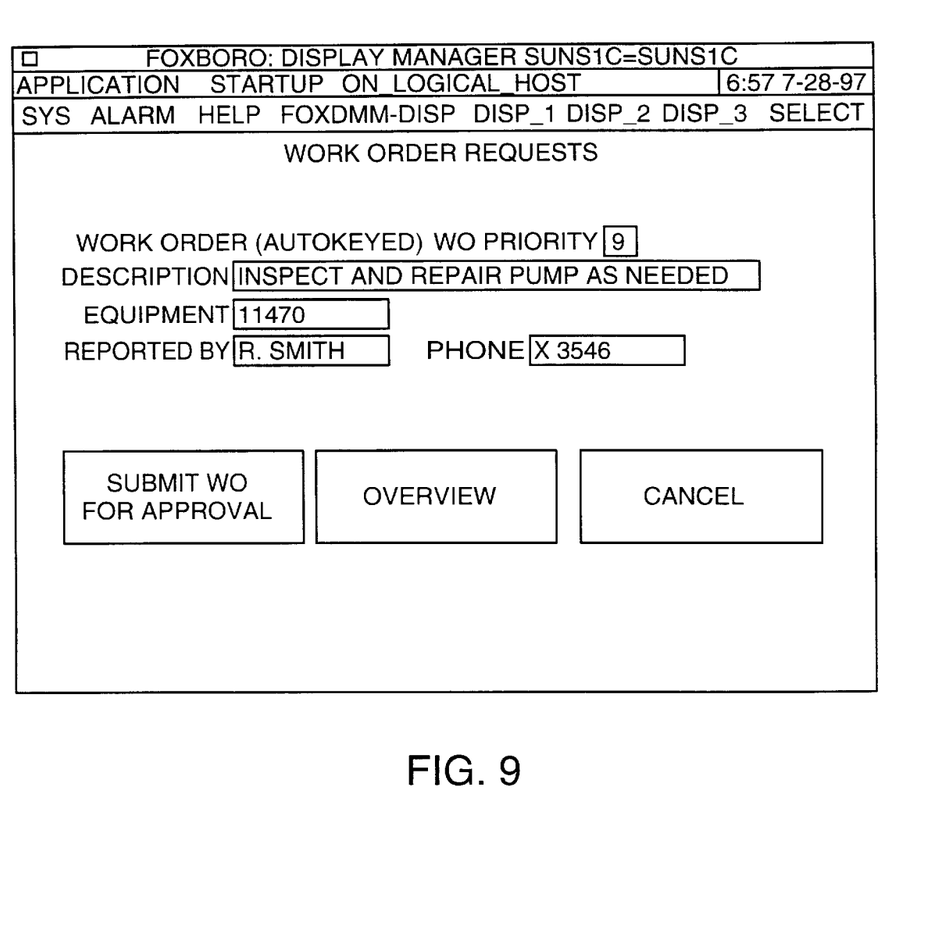
FIG. 9 is a screenshot of the work order requests screen.

When a problem arises with a piece of equipment, the operator is able to initiate a new work order request by selecting work order requests using a graphical user interface. A work order can be created for the equipment in question from the work order requests screen shown in FIG. 9. Then the work order is transferred to the maintenance database for approval and scheduling.

Figure 10:
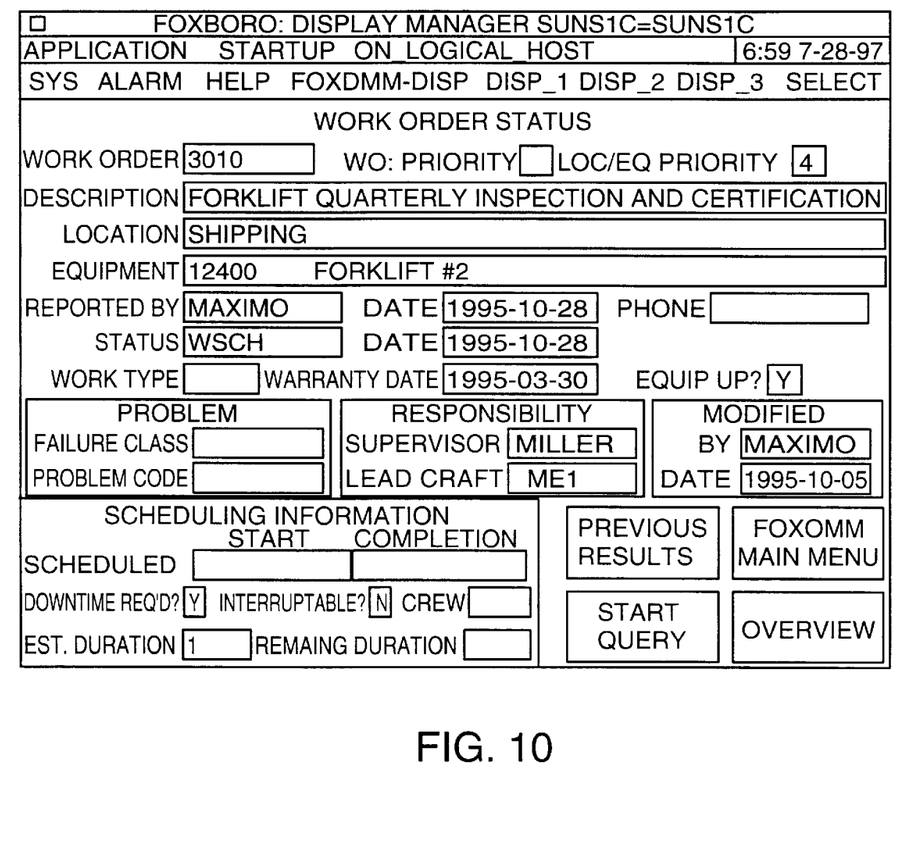
FIG. 10 is a screenshot of the work order status report screen.

The operator can check the status of the work order request by viewing the work order status screen of FIG. 10. Pertinent information about the work order such as if and when the work has been scheduled, estimated time to completion, and the crew assigned to do the work, are displayed on this screen.

Plant maintenance information may be obtained by the DMM system through manual entry or through SQL database importing of maintenance information such as equipment records, labor resources, parts inventory, trouble codes, etc. A typical implementation would involve extracting information from the existing maintenance system using SQL or delimited ASCII records in a format suitable for importing to the CMMS database. Information not electronically available could be manually entered.

Appendix A is a listing of record type definitions and C++ class definitions used by a configurator implemented using the Foxboro I/A Series system and PSDI's MAXIMO. These definitions are employed in the software system represented in the microfiche appendix.

Although elements of the invention are described in terms of a software implementation, the invention may be implemented in software or hardware or firmware, or a combination of the three.

The present invention has been described in terms of an embodiment. The invention, however, is not limited to the embodiment depicted and described. Rather, the scope of the invention is defined by the claims.

What is claimed is:

1. A system comprising:

one or more computers operable to run process control software;

one or more computers operable to run maintenance management software; and computer program means for enabling communication between the process control software and the maintenance management software, the computer program means including association means for associating process control process variables accessible to the process control software with maintenance management data equipment identifiers accessible to the maintenance management software, the association means including means to create a link by associating a select one of the process variables with a select one of the equipment identifiers using a common graphical user interface for both the process control software and the maintenance management software, the common graphical user interface displaying a plurality of process variables and a plurality of equipment identifiers in a dialog box, the dialog box containing controls allowing a user to indicate an association of process variables with equipment identifiers.

2. The system of claim 1, wherein:

the association is indicated by selecting a first entry in the first column and dragging and dropping the first entry on a second entry in the second column, thereby establishing a link between the first entry and the second entry.

3. The system of claim 1, further comprising:

permitting the user to associate with a link a procedure for handling the process variable associated with the equipment identifier by the link.

4. The system of claim 1, wherein:

in response to the user selecting a monitoring type or alarm type from among a set of displayed monitoring types and alarm types, displaying an appropriate corresponding dialog box permitting the user to select a parameter value from a plurality of parameter values.

5. The system of claim 4, wherein:

the range of parameter values includes runtime, point, process alarm, and system alarm.

6. The system of claim 5, wherein:

in response to the user selecting a parameter value of runtime, the system responds by displaying a dialog box permitting the user to select a scan rate frequency.

7. The system of claim 5, wherein:

in response to the user selecting a parameter value of point, the system responds by displaying a dialog box permitting the user to select a scan rate, high and low warning levels, and high and low action levels.

8. The system of claim 5, wherein:

in response to the user selecting a parameter value of process alarm, the system responds by displaying a dialog box permitting the user to select an alarm type.

9. The system of claim 5, wherein:

in response to the user selecting a parameter value of system alarm, the system responds by displaying a dialog box permitting the user to select an alarm subsystem and associated alarm codes.

10. A computer program, tangibly stored on a computer-readable medium, for use in a system comprising one or more computers operable to run process control software and one or more computers operable to run maintenance management software, the program comprising instructions to:

associate process control process variables accessible to the process control software with maintenance management data equipment identifiers accessible to the maintenance management software by creating a link associating a select one of the process variables with a select one of the equipment identifiers using a common graphical user interface for both the process control software and the maintenance management software, the common graphical user interface displaying a plurality of process variables and a plurality of equipment identifiers in a dialog box, the dialog box containing controls allowing a user to indicate an association of process variables with equipment identifiers.

11. A process of integrating two pre-existing separate systems, one a process control system and the other a maintenance management system, for the same plant process, comprising:

associating process control process variables accessible to the Process control software with maintenance management data equipment identifiers accessible to the maintenance management software, by creating a link associating a select one of the process variables with a select one of the equipment identifiers using a common graphical user interface for both the process control software and the maintenance management software, the common graphical user interface displaying a plurality of process variables and a plurality of equipment identifiers in a dialog box, the dialog box containing controls allowing a user to indicate an association of process variables with equipment identifiers.

* * * * *